US008839418B2

(12) United States Patent
Hulten et al.

(10) Patent No.: US 8,839,418 B2
(45) Date of Patent: Sep. 16, 2014

(54) FINDING PHISHING SITES

(75) Inventors: Geoffrey John Hulten, Lynnwood, WA (US); Paul Stephen Rehfuss, Seattle, WA (US); Robert Rounthwaite, Fall City, WA (US); Joshua Theodore Goodman, Redmond, WA (US); Gopalakrishnan Seshadrinathan, Redmond, WA (US); Anthony P. Penta, Bellevue, WA (US); Manav Mishra, Kirkland, WA (US); Roderic C. Deyo, Redmond, WA (US); Elliott Jeb Haber, Fall City, WA (US); David Aaron Ward Snelling, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 1906 days.

(21) Appl. No.: 11/335,902

(22) Filed: Jan. 18, 2006

(65) Prior Publication Data

US 2007/0192855 A1 Aug. 16, 2007

(51) Int. Cl.
*H04L 9/00* (2006.01)
*H04L 29/06* (2006.01)

(52) U.S. Cl.
CPC ......... *H04L 63/1483* (2013.01); *H04L 63/1441* (2013.01); *H04L 63/08* (2013.01)
USPC .................................. 726/22; 726/23; 726/25

(58) Field of Classification Search
None
See application file for complete search history.

(56) References Cited

U.S. PATENT DOCUMENTS

| 7,457,823 | B2* | 11/2008 | Shraim et al. ................ 1/1 |
| 2003/0167308 | A1* | 9/2003 | Schran ..................... 709/205 |
| 2006/0095521 | A1* | 5/2006 | Patinkin .................. 709/206 |
| 2006/0095955 | A1* | 5/2006 | Vong .............................. 726/3 |
| 2006/0242706 | A1* | 10/2006 | Ross ............................. 726/23 |
| 2006/0253580 | A1* | 11/2006 | Dixon et al. .............. 709/225 |

FOREIGN PATENT DOCUMENTS

WO  WO 2005091107 A1 * 9/2005

* cited by examiner

*Primary Examiner* — Alexander Lagor
(74) *Attorney, Agent, or Firm* — Bryan Webster; Sade Fashokun; Micky Minhas

(57) ABSTRACT

Described is a technology by which phishing-related data sources are processed into aggregated data and a given site evaluated the aggregated data using a predictive model to automatically determine whether the given site is likely to be a phishing site. The predictive model may be built using machine learning based on training data, e.g., including known phishing sites and/or known non-phishing sites. To determine whether an object corresponding to a site is likely a phishing-related object are described, various criteria are evaluated, including one or more features of the object when evaluated. The determination is output in some way, e.g., made available to a reputation service, used to block access to a site or warn a user before allowing access, and/or used to assist a hand grader in being more efficient in evaluating sites.

10 Claims, 5 Drawing Sheets

FINDING PHISHING SITES

BACKGROUND

Phishing (correctly spelled starting with a "ph" in the English language) generally refers to the concept of tricking a computer user into submitting personal information, ordinarily financial-related data, to a bogus website. Phishing and its variants (phish, phished, and so forth) also refer to the techniques used to trick users. Phishing is typically used to obtain the submitted information for fraudulent criminal use.

One common type of phishing tactic is to send a large number of users an email message containing a link in the message contents, with the identity of the message sender and the message content arranged to look like the source is a legitimate business. The message may indicate that the user needs to resubmit some personal data so that the business can continue to serve the user, such as to restore financial information that the business lost. The link, however, is to a bogus website that, if carefully constructed, may look virtually identical to the pages offered by the legitimate site. Because links are difficult to read, and can even use foreign characters that look like normal characters to the user, some users are fooled into clicking the link, and often thereafter submit valuable data.

Presently, legitimate enterprises fight phishing in a number of ways. For one, possible phishing sites are voluntarily identified by users, and their complaints may be investigated. Well-known, legitimate internet access providers and/or computing services such as Microsoft Corporation's Hotmail service provide mechanisms that facilitate user reporting of junk mail and suspicious sites. Other schemes (e.g., closely monitored, specially-created seeded dummy email addresses) look for unsolicited junk email and emails likely directed to obtaining information fraudulently. When some threshold is met with respect to identifying an email/site as possibly suspicious, e.g., a certain amount of users have submitted a complaint regarding the same message, an expert "hand" grader working for the legitimate service evaluates the message and linked-to site, and determines whether the message and/or access to the site should be blocked.

While the above model works to prevent phishing to an extent, users on the order of hundreds of millions may experience and submit complaints that in turn result in tens of thousands of reports being generated every day. This overwhelms an enterprise's ability to hand grade the sites. At the same time, phishing sites are known to operate for as little as a few hours or so, e.g., before reformulating the email message and/or moving to a different address, and thus any message/site blocking performed by a service needs to be quickly implemented.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards processing data from at least one data source related to phishing sites, and using a predictive model to determine whether a site is likely to be a phishing site. For example, processing the data may comprise generating a report for each of a plurality of data sources, aggregating the reports and applying the predictive model to the aggregated reports. The predictive model may be built using machine learning based on training data, e.g., including known phishing sites and/or known non-phishing sites.

Various means for determining whether an object corresponding to a site is likely a phishing-related object are described, including determining the likelihood based on one or more features when evaluated against the aggregated data. The determination may be output in some way, e.g., made available to a reputation service, used to block access to a site or warn a user before allowing access, and/or used to assist a hand grader in being more efficient in evaluating sites.

The model is strengthened by aggregating phishing-related data from a plurality of sources, which, for example, may include at least one source corresponding to an email service and at least one source corresponding to an internet access service. The features and properties of each site may be logged, and used to develop more accurate training data. The model is strengthened further by using known phishing sites as well as known non-phishing sites, e.g., sites that appear to have features that would indicate phishing, but in actuality have been graded as non-phishing sites.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
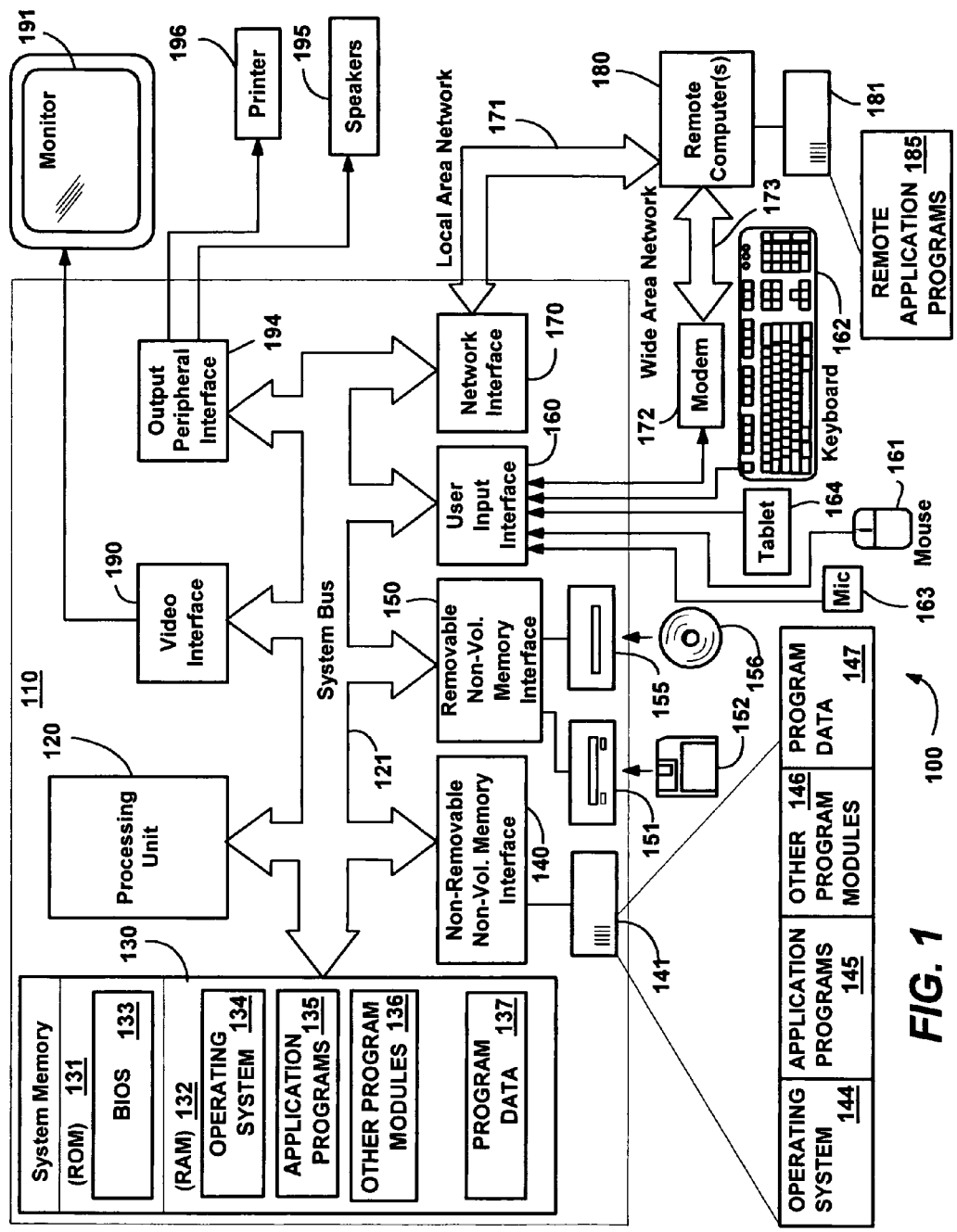
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN)

171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

Finding Phishing Sites

Various aspects of the technology described herein are directed towards finding phishing sites using automated mechanisms to analyze data and thereby establish which sites are most likely phishing sites. As will be understood, this technology is not limited to phishing sites, but can be applied to distinguish other types of sites, such as sites that have bad reputations and/or may be considered malicious in other ways.

In general, many of the examples herein are directed towards a particular example architecture/implementation in which various data sources are analyzed to determine probability values for sites, based on trends in the data and the like. These probability values may be used in numerous ways, e.g., directly distributed to servers, converted to a list of sites to block, warn, or take advantage of client security settings, to help hand graders determine which sites to carefully evaluate, and so forth. As such, notwithstanding the examples below, it is understood that any mechanisms may be used to implement the model described herein.

Thus, as is understood, the present invention is not limited to the examples, structures or functionality described herein. Rather, any of the examples described herein are non-limiting, and the present invention may be used various ways that provide benefits and advantages in computing in general.

Figure 2:
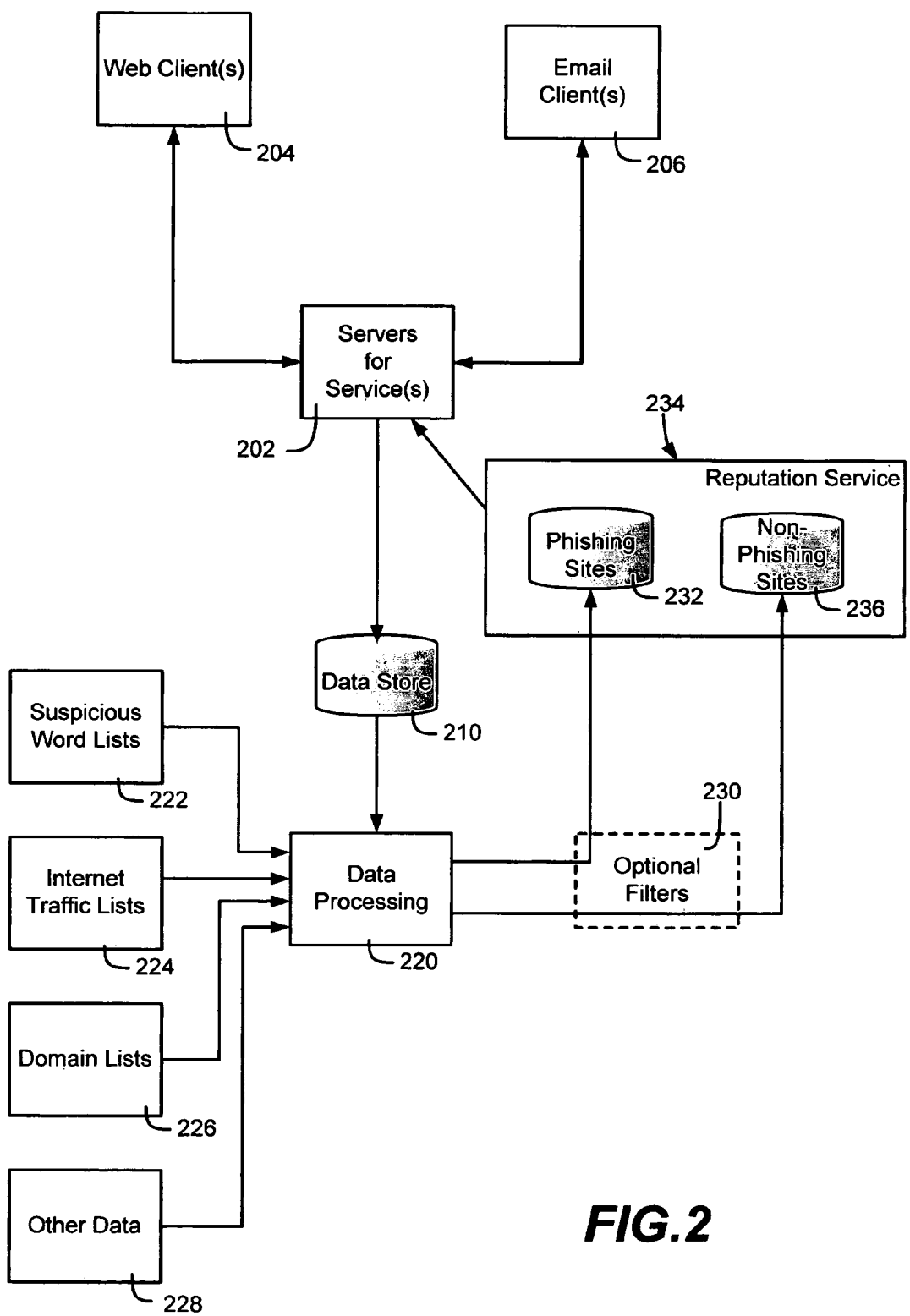
FIG. 2 is a block diagram generally representing the accumulation of phishing-related data obtained from clients.

Turning to FIG. 2 of the drawings, there is shown a simplified example block diagram by which a service comprising a set of servers 202 provides internet access services to web clients 204 and email services to email clients 206. As generally represented in FIG. 2, the web clients 204 and email clients 206 may provide feedback regarding emails having links to suspicious websites, and/or may provide feedback regarding suspicious websites directly, independent of how the link was obtained. The feedback may be user-initiated, or may be automated to an extent, e.g., a browser or email program may include filtering code that submits a complaint whenever a site or email message appears to be suspicious. The clients may be updated with information based on machine learning, described below. Although FIG. 2 shows the web clients 204 and email clients 206 directly providing this information to the services' servers 202, it is understood that "out-of-band" reporting is another alternative way for users to submit data.

In FIG. 2, the servers 202 collect the data in a data store 210 or the like. As described below with reference to FIG. 3, numerous other data sources may be used, and there may be separate stores for web client data and email client data, however for purposes of simplicity, FIG. 2 shows only the data store 210, which may represent a single source or multiple sources.

In any event, and as described below, the data is processed via data processing means 220 to extract data as to any site having properties that indicates a phishing site. To this end, the data processing means 220 may rely on criteria such as suspicious word/phrase lists 222 (e.g., "credit card" or "bank account"), domain lists 224 (e.g., good reputation versus unknown versus bad), traffic lists 226 regarding amount and characteristics of traffic to a site, and other data 228. For example, geographic data (via the IP address) may be used to determine if a site is being hosted in a country or other physical location having a reputation as a location for phishing scams and/or located remotely relative to the enterprise that the site is purporting to represent. Seasonality may be a factor, e.g., hourly, daily, day of week, weekly, monthly and so forth. In essence, virtually any criteria may be used to evaluate the properties of a site.

FIG. 2 also shows (via a dashed block) optional other filtering 230, such as hand grading or other mechanisms. Note that hand grading may be done on already-published data, e.g., block a highly-suspicious site immediately, and then hand grade it to determine whether to unblock it.

In general, the result is a set of phishing sites 232 that are published to the services' servers, e.g., via a reputation service 234 to block (or at least warn) the services' users from accessing bad sites, as well as block any email that distributes links to such sites. Known non-phishing sites 236 may also be published, for example in case other mechanisms may be blocking valid sites that appear suspicious but in actuality are not.

Note that FIG. 2 (as well as FIG. 3, described below) depict only example architecture(s), and that a list or other data structure containing known phishing sites may be alternatively (or in addition to) provided to a client via other mechanisms, e.g., not necessarily by querying a service. For example, a list of sites may be provided as part of a data file or code update, such as provided with a regularly scheduled anti-spam update, antivirus update, anti-spyware update and/or in numerous other ways.

Figure 3:
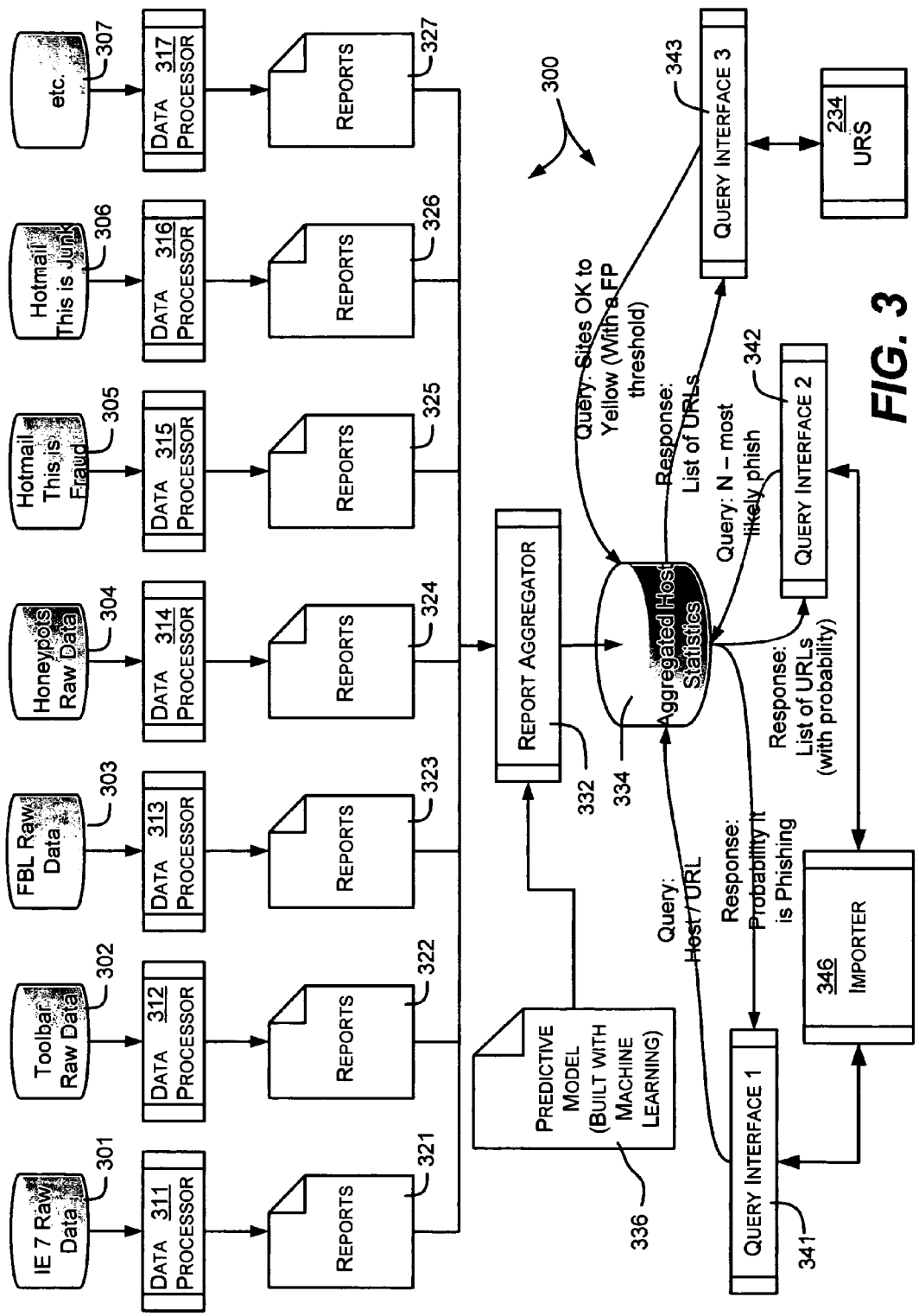
FIG. 3 is a block diagram representing an example architecture for processing phishing-related data.

Turning to a more detailed example, FIG. 3 contains a high-level view of one example architecture (also referred to as a phish-finder system or anti-phishing system) 300 in which a phishing detection implementation may operate. As generally represented in FIG. 3, a variety of Phish Data sources 301-307 are available to the example anti-phishing system 300.

In general, there are sources corresponding to browser (e.g., Internet Explorer 7.x) submissions 301, toolbar submissions 302, FBL (feedback loop, e.g., provided by volunteer users of a service) submissions 303, honeypots (closely monitored seeded/dummy email addresses) 304, and email service-supplied (e.g., Hotmail) fraud and junk mail submissions, 305 and 306, respectively. Note that although a limited number of example sources are shown, there is no limitation to the number and type of data; indeed the "etc" source labeled 307 in FIG. 3 represents additional sources and types of phishing-related data. For example, it is likely that legitimate enterprises will share some of their data with one another, providing many more sources. Other examples include data from IP/domain registrars, certificate-related information, including certificates and the reputation of the certificate issuer, traffic changes in time (e.g., spikes in visits suddenly appearing), fuzzy matching email messages that have similar text to previously-known phishing messages, zombie heuristics indicative of whether a site is on a personal computer over a broadband connection, and so forth.

Although not readily apparent in FIG. 3, some of the sources are more current with respect to data than others, e.g., honeypot data 304 is very up-to-date (nearly instantaneous), whereas browser, toolbar and user-provided data 301, 302, 305 and 306 is moderately up-to-date, while FBL-like data 303 are relatively dated (but nevertheless useful).

Additional details about some of the data sources are set forth below. Note that one main attack vector for phishing is e-mail, so known spam sources may include many URLs to phishing sites. Reports from Internet Explorer 7.x/MSN Toolbar will be available to users, who may benefit from an antiphishing plug-in to report URLs as phishing or as not phishing. Although the quality of such reports may not be ideal, the sheer number of reporters in conjunction with cross-checks with other data sources will make such data actionable.

A service such as Hotmail allows users to report sites (corresponding to email messages) that are believed to be fraudulent. To this end, the service may add a fraud reporting facility to its user interface, e.g., similar to the 'Report as Junk' facility that is currently available. These complaint reports can be made by any service user about any message, and thus such data may be used in conjunction with careful cross-checking techniques, and/or along with requiring a threshold amount of similar reports, to avoid spurious reports.

FBL (feedback loop) spam is another data source, and makes message contents available. Although it has a latency of about one day, FBL data is still useful; note that spam is a primary attack vehicle for phishing, and spam data ordinarily contain a large number of phishing messages mixed in with a flood of general spam data. Phishing sites have been successfully found from this data by using tools to narrow down possible candidates (e.g., by looking for keywords and phishing tricks), and by hand examining messages that were flagged by the tool. Although the current lag in average FBL message arrival time is about one day, which tends to reduce the value of locating currently-operating phishing sites via this data source, such information may be relevant for a long-operating site, and at least be used in training the predictive model, as described below.

Honeypots and other dynamic trap accounts receive e messages that are sent to seeded/inactive accounts respectively. Messages sent to dynamic trap accounts may be heavily down-sampled to provide actionable information that is like the honeypot data, but potentially with a much larger sample.

Ad hoc phishing reports from reliable, high-reputation sources may also be used to detect phishing sites. Another potential source is "Password Sharing Data" that finds sites where users type in their username/passwords from other sites, and reports this suspicious behavior to a central server. If enough users report a site X as asking for their site Y password, this provides strong evidence that X is phishing Y.

To eliminate false positives, due to there being many non-phishing URLs in the above-identified data sources and others, other sources of information may be used. For example, FBL Good Mail includes URLs that occur more often in good mail than in spam mail, and are less likely to be phishing attacks. Domain Traffic Information refers to domains that have been receiving large amounts of traffic consistently for a long period of time; such domains are less likely to be hosting phishing sites, (with the exception of domains public hosting sites or redirectors, which are excluded to the extent possible).

A raw sample of all of a service's email is useful for fingerprints, (wherein a fingerprint of an object such as an email message comprises a (typically small) representation of the object, such that if two object have the same fingerprint then the two objects are, with high probability, equivalent for some given purpose), and may be used to help smooth out noise and inconsistencies in our other data sources. For example, this data will help distinguish URLs in fraud-reporting data (that are part of a phishing attack) from URLs appearing in large valid promotions that are often erroneously reported as fraud. Note that, for example, the complaint rate on phishing URLS may be ten percent, while the complaint rate on the valid promotion may be less than one percent, but the valid promotion may be ten times bigger and thus receive the same raw number of complaints as the phishing attack. The raw sample will distinguish between such instances.

Ranking services, such as MSNRank, are based on searches of a URL or other URLs in a domain, and also may provide valuable data for use in eliminating false positives. For example, URLs that have been indexed by a searching service and have high rankings are unlikely to be phishing sites. Similarly, pre-built lists of known legitimate banking or commerce sites corresponding to URLs on known good hosts are probably not phishing attacks.

Returning to FIG. 3, in general, the raw data from each of these sources 301-307 is processed, e.g., by respective data processing means 311-317 into machine-readable (and optionally human-readable) reports 321-327. For example, each data source 301-307 may have an associated process that monitors data as it arrives on the source in real time, extracts the properties needed by the system (examples of which are described below) and inserts them into a report store for the data stream. As described above with reference to FIG. 2, any of these processors 311-317 may access additional information as needed, such as top traffic lists, target domain lists, suspicious word lists, and so forth.

In this example, there is one report store per data stream which contains the information extracted from the data on the stream, e.g., accumulated for the past N days. The value of N may be determined empirically and may be different for different data sources, and in fact there may be multiple N values for a single data source; e.g., multiple types of information may be extracted from the same data source and each type of information may be aggregated over multiple different time spans. The value N may also be a fraction of a day and may vary. In addition to containing information aggregated over various time spans, each report may be generated in any time frame that is appropriate for its corresponding source, e.g., hourly, daily, weekly and even immediate if needed, e.g., if a serious threat is detected during processing of the raw data.

A report aggregator 332 is provided to aggregate information from the report stores 321-327 into a description 334 of how each host (or URL) has been observed in the data streams over the selected time periods. The aggregator 332 also applies a predictive model 336 (the training of which is described with reference to FIG. 5) to the aggregated information to estimate the probability that the specified object is a phishing site/page.

These aggregated statistics 334, which may comprise elaborate statistics or be as simple as probability data with some supporting information, are stored for querying by query interfaces 341-343. The aggregator 332 may be run periodically (e.g., once an hour, or once every twenty minutes) and/or as needed to update the aggregated statistics 334.

The query interfaces 341-343 are provided for other components to take advantage of the statistical and other information 334 generated by the phish finder system 300 of FIG. 3. For example, Query Interface 1 (also labeled 341) allows other components such as an importer 346 to determine the probability that a specific host/URL is involved in a phishing attack. Query Interface 2 (also labeled 342) allows other components such as the importer 346 to request lists of hosts/URLs ordered by the probability that they are involved in Phishing. For example, this interface may be used to ask for the top 1,000 most likely phishing sites seen in any data source, the top 300 mostly likely phishing sites from the end user reports, the 1,000 sites reported by site owners that are least likely to actually be phishing sites, and so forth.

Query Interface 3 (also labeled 343) allows a component such as the URS (URL reputation service) 234 to find sites that have a very high probability of being phishing sites, e.g., for semi-automatic "red-alert" or "yellow alert" generation, (or some finer-grained alerting mechanism). This interface accepts false positive thresholds. For example, a sample query may be something like "list all the sites that may get a yellow alert while maintaining a false positive rate of less than one percent"

As can be readily appreciated, a substantial concept of the above-described anti-phishing system 300 and strategy is to rapidly get known phishing web sites into the URS 348 so that users of a legitimate provider/email service are protected from browsing to phishing sites. In part, this is performed by relying on external data providers to provide lists of known phishing sites, however the architecture of FIG. 3 enables anti-phishing strategies that need not rely solely on third-party data providers. This system 300 is thus a substantial improvement, as third party providers may not be as cooperative as desired or provide high-quality reports, and may not provide sufficient coverage to detect otherwise detectable phishing sites. As can be readily appreciated, the architecture of FIG. 3 leverages many types of data sources, including those of data providers that are directly offering the services that are being protected.

In addition to rapidly finding as many phishing sites as possible given streams of data from the sources 301-307 (which includes any other sources), the anti-phishing system 300 should not erroneously flag non-phishing sites as being phishing sites. To this end, the anti-phishing system 300 may have a confidence-ranked list of suspicious URLs available for a parallel process to extract and evaluate For example, the anti-phishing system 300 may produce a list of likely phishing sites, ordered most-likely-phishing first. This list may be passed to graders who verify or reject that the site is phishing and send the verified phishing sites as output to the reputation service. For the sites the system finds most-likely-phishing, there may be a second path where the site is output to the URS immediately and also sent to the graders for verification, whereby if disconfirmed by the graders, the site is removed from the URS.

Based on the data sources 301-307, the system 300 is able to collect a significant amount of statistical information about URLs, including their features and properties. Note that each property can be tracked per URL, per domain, and per IP address (via a DNS lookup on the domain). Properties may also be tracked at several different time resolutions, e.g., in the last ten minutes, hour, day, week, month, and all time (particularly for known good URL sources).

For email-related data sources, e.g., including FBL spam, FBL good, "This is junk," "This is fraud," honeypots, dynamic trap accounts, and raw e-mail samples), a given URL may be associated with the following features/properties:

Number of times the object (URL, web server domain, web server IP) appeared in the source.

Ratio of the number of appearances in the last period to the current one (e.g. N times more appearances today than yesterday); ratio compared to one week ago (for the one day period); ratio compared to long-term averages and standard deviations; other time series features.

Number of times the object appeared in the source along with a commonly-phished brand (e.g. names of well-known financial institutions, credit cards, payment services, e-commerce sites, auction sites and so forth) in the body or subject of the message.

Number of times the object appeared with a phishing related word (e.g. login, password, credit, and so forth) in the body or subject of the message.

Whether common brands or phishing-related words appear in the host name or the URL.

Number of times the object appeared in the source along with a link to a commonly-phished domain, such as a well known financial-type domain, or top traffic domain, when the domain from the URL in question was not also to the commonly-phished domain (typically when the source contains emails).

Number of times the object was an exception (also referred to as "odd-man-out," where the object appears in a message or page together with some number of commonly-phished domains, but does not itself belong to a commonly-phished domain) when it appeared with commonly-phished domains, well known financial domains, or top traffic domains.

Number of times the object appeared in an email and the PRD (purported responsible domain) of the message was a commonly-phished site, a well known financial domain, or a top traffic domain.

Number of times the object appeared in the source and got a sender ID fail (hard or soft) for a known financial domain.

Number of times the object appeared in the source and got a sender ID pass for a known financial domain or a known good e-mail sender.

Number of times the object appeared in a message that got a move/delete SCL (spam confidence level).

Number of times the object appeared in the source with a phishing trick (numeric IP, obfuscated URL, HREF mismatch, "look-alike URL", and so forth).

Number of times the object appeared in an email message that had a fingerprint match with a known phishing message.

Number of times the object appeared in an email message that had a fingerprint match with a message from a known phish target domain.

Number of hours since the object was first observed in the data source.

Number of hours since the object was last observed in the data source.

Whether the host is a numeric IP address, and if so, whether the corresponding domain name matches zombie heuristics.

The system 300 may also track ratios of these values (as value from spam source divided by value from non-spam source) for the following combinations; (note that these are only some possible example combinations of sources, and other combinations may be used):

FBL Spam/FBL good
FBL Spam/(FBL Spam+FBL Good)
This is Junk Data/Raw data sample
This is fraud data/Raw data sample
Honeypot/Raw data sample
DTA/Raw data sample The system 300 also may track the number of times a URL appeared recently in a spam source and never in a good source.

For each object, the system may also track its:
Traffic (e.g., according to the MSN CEIP data)
Rank from search, e.g., MSNSearch (and/or the average of URLs for that web server domain/web server IP in the data)
Geolocation
Registrar information on the domain (how long ago was it registered)
Last-hop router of a traceroute to the host Turning to an explanation of some example ways to identify phishing sites and measuring the performance of the system 300, consider that at some date data indicates that phishing sites are active for N days on average (where N may include a fraction, and may be less than one) before being shut down. As can be readily appreciated, given this average, the benefit of detecting a phishing site is proportional to the amount of time remaining after the site is detected; metrics should take this detection latency into account. For example, the metric for "FP" (false positive) costs of blocked non-phish URLs may be time-independent, since such errors are probably resolved by other reporting and checking functions. Conversely, the metric for "FN" (false negative) costs of undiscovered phish URLs are likely time-dependent, in order to reward the detection system for minimizing detection latency. Detection latency may be specified as "time until blocked" or "time until URL appears in top M suspicious objects" for some parameter M. Thus, the following may apply:

FP': metric may be usual FP rate: fraction of non-phish URLs that were detected as phishing (0<=FP'<=1).
FN': metric may be (1/(number of phishURLs)*sum_phishURLs min(1, (hours till detected)/24*N). In the formula, for a phish URL u, the contribution to the sum is 0 if u is detected as phishing after 0 hours; the contribution is 1 if taking more than 24*N hours (or never detect it), and may be linear in between. This is the usual FN rate, weighted by detection latency; (0<=FN'<=1).

FP' versus FN' may be plotted for a ROC-like curve, or a scoring function may be formed, e.g.:

$$Score = k * FP' + (1-k) * FN'$$

where 0<=k<=1 is a constant that defines the comparative cost of a FN compared to an FP.

One advantage of the system 300 is the ability to rapidly get known phishing web sites into a URL reputation service, which then may be queried by Anti-Phishing filters and used to protect users from browsing to known phishing sites. By leveraging available data sources and using probabilistic machine learning algorithms, the system 300 automatically finds sites that are phishing, as well as detecting likely false positives. Phishing sites are given a bad reputation in the URL reputation service, where they will receive a caution or block from anti-phishing clients. Graders also may use the probabilities produced by the models to prioritize which sites they grade.

By way of example, consider a new web site that gets reported as being a phishing site by a user of an internet access service. The system 300 examines statistics about how that site appeared in numerous data sources, and uses this information, along with a probabilistic model, to determine the probability that the site actually is a phishing site. If this probability is above a target threshold, the site can be automatically propagated to the URL reputation service with a bad reputation and, in any case, the probability can be used to prioritize grading.

To summarize, the anti-phishing system 300 uses various data sources to find phishing sites, including sources that are closely affiliated with the email and internet access services being offered, (e.g., non-third party sources). The combination of sources provides a stronger model, especially when aggregated across both email-based and browser-based sources, and the model is further strengthened by using data sources that contain known non-phishing sites (e.g. FBL good mail). Features are extracted about the sites, including aggregations done at a host/site level, and probabilistic models are used to make predictions regarding phishing sites. The probabilities that are found may be used to automatically warn users or block users from visiting dangerous sites, as well as to help human graders be more efficient in grading. Trend analysis may be used as well, e.g., spikes or anomalies may be an indicator of something unusual.

In general, the system 300 works by monitoring how web hosts or site URLs appear in the data sources that are available, and by using machine learning to build models that predict the probability that any given host is a phishing site from the way a host appears in the data sources. For example, consider a host that gets reported as a FN by an internet service user, where a phishing filter indicated safe, but the user thinks it is a phish. If that host appeared ten times in a feedback loop on messages that got a 'SenderID pass' from a known good sender, then the system may be fairly certain it is unlikely that the reported host is a phishing site. The system would be more suspicious when the host is a numeric IP, and it appears in ten spam messages in an email service feedback loop, and in every one of these message it is an exception with a known phishing target.

Whenever a new message or report arrives on one of the data sources 301-307, the message or complaint report is scanned by the system 300, any web hosts (or site URLs) it contains are extracted, and a report is recorded. For example, with respect to email messages, for every URL in a message that arrives via the feedback loop, properties are recorded in the report. Such properties may include:

GUID—the GUID of the message; (note that this is an identifier for the message, not technically a property used for determining phish/not-phish)
reportTime—the time the Feedback user reported the message as spam or good
rcvdTime—the time the Feedback user received the message
host—the host of the URL (e.g., foo.com for three letter TLDs, bar.bax.us for two letter TLDs, and the complete IP address for numeric hosts)
url
hasTargetWordBody—True if the body of the message contains one of several dozen phishing related words (including commonly phished brands, login, password, and so forth)
hasTargetWordSubject
hasTargetPRD—true if the PRD (purported responsible domain) of the message is a commonly phished domain
hasPhishTrick—True if the message has any URL that triggers one of the phishing heuristics
hasSIDFail—True if the message has a fail result code from a sender ID check
hasSIDPass
numDomainsInMessage—The number of unique domains of web hosts in the message isOMOWithTargetDomain—True if the host from this report is not a commonly phished domain, but every other web host in the message is a commonly phished domain isWithTargetDomain—True if the host from this message is not a commonly phished domain, but there is a web host in the message from a commonly phished domain isTargetDomain—True if the host from this report is from a commonly phished domain isTopTrafficDomain—True if the host from this report is on a top traffic list isNumericHost—True if the host from this report is a numeric IP address isFBLSpam isFBLGood For every browser-initiated report that arrives, properties including some or all of the following examples may be recorded in the report:

GUID—the GUID of the report (again, similar to a message GUID, an identifier for the report, not technically a property used for determining phish/not-phish)

Host—the host of the reported URL (foo.com for 3 letter TLDs, bar.bax.us for 2 letter TLDs, and the complete IP address for numeric hosts)

reportTime—the time the URL was reported isTargetDomain—True if the host from this report is from a commonly phished domain isTopTrafficDomain—True if the host from this report is on a top traffic list isFp—True if the browser phishing filter marked the URL as phish but the user reports that it is not phishing isTp—True if the browser phishing filter marked the URL as phish and the user reports that it is phishing isfn—True if the browser phishing filter marked the URL as not phish but the user reports that it is phishing isTn—True if the browser phishing filter marked the URL as not phish and the user reports that it is not phishing The system 300 also has two sources of classifications that it may monitor, including grader marks on the browser-generated reports and hand-tagged FBL messages. With respect to grader marks on the browser-generated reports, each complaint report may be eventually examined by a human grader who may give it one of the following marks:

phish=true phishing URL nocat=not a phishing site dead=the site was unreachable placeholder=the site was a placeholder page foreign=foreign site could not be graded redirect=the site was a redirector norepro=the grader couldn't reproduce what the customer said about the site Once marked as a phish, the URL is known to be phishing in any other data sources. The system can also roll upwards and consider the host that the URL was on to be phishing. The system may also use the nocat reports for counter examples.

With respect to hand-tagged FBL messages, the hand evaluations made on messages in the FBL are recorded, resulting in known phishing sites being tagged. These are also used as training data, as described below.

Turning to a consideration of training, training examples are produced from the data reports and phishing classifications described above. Each example corresponds to a web host (or site URL) that appeared in one of the data sources, and the features of the example record information about the contexts in which the host appeared. Examples are produced by aggregating these properties over time-windows of the data sources, e.g., by using every browser-generated complaint report over the past day, every FBL spam report over the past week, and every FBL good report over the past month.

Note that different training and corresponding usage models may be made available based on different time frames. For example, near-instantaneous honeypot data 504 (FIG. 5) may be used to produce a quick-react model, e.g., for newly seen URLs, in contrast to a medium speed model that may be built and used based on browser, toolbar and/or user-provided data 501, 502, 505 and 506. A longer-time-frame model (e.g., based on FBL data 503) model also may be built and used, and while possibly old in usage, may provide more accurate results). In sum, there may be multiple models, each trained on the data available at some particular interval after the first observation of a phishing attack, (where some example intervals are described below).

Features may be recorded for each host, including some or all of the following example features:

isPhish—True if one of the sets of classified mail have a verified phishing site on this host.

nummessages—Number of FBL messages that contained a link to this host.

numURLs—number of unique URLs from this host that were seen in the FBL.

numIETP—number of times a user reported that the browser filter called the site a phish site and they agreed.

numIEFP—number of times a user reported that the browser filter called the site a phish and they disagreed numIETN—number of times a user reported that the browser filter called the site not phish and they agreed.

numIEFN—number of times a user reported that the browser filter called the site not phish and they disagreed.

numIEURLs—number of unique URLs that IE user reported on this domain.

pFBLGood—the portion of the FBL messages that were marked good by the FBL user pFBLSpam isTopTraffic isTargetDomain pWithTargetWordBody—the percentage of the FBL messages that the host appeared in that had a target word in their body pWithTargetWordSubject pWithPhishTrick pWithTargetPRD pWithSIDPass pWithSIDPassForTargetPRD pWithSIDFail pWithSIDFailForTargetPRD pWithSIDFailWithTargetDomain—the percentage of the FBL messages that had a SID fail and also had a link to a target domain pWithSIDFailWithTargetWord—the percentage of the FBL messages that had a SID fail and a target word (in either body of subject)

pOMOWithTargetDomain—the percentage of the FBL messages where the host was an odd-man-out with a target domain pWithTargetDomain—the percentage of FBL messages where the host appeared and there was a target domain in the message and the host isn't a target host pWithPhishWithTargetWord—the percentage of FBL messages where the host appeared that had both a phishing trick and a target word pWithPhishWithTargetPRD isNumericHost In one implementation, hosts that appear in the report stream but not in the FBL have a −1 for each of the probability-related features described above.

Figure 4:
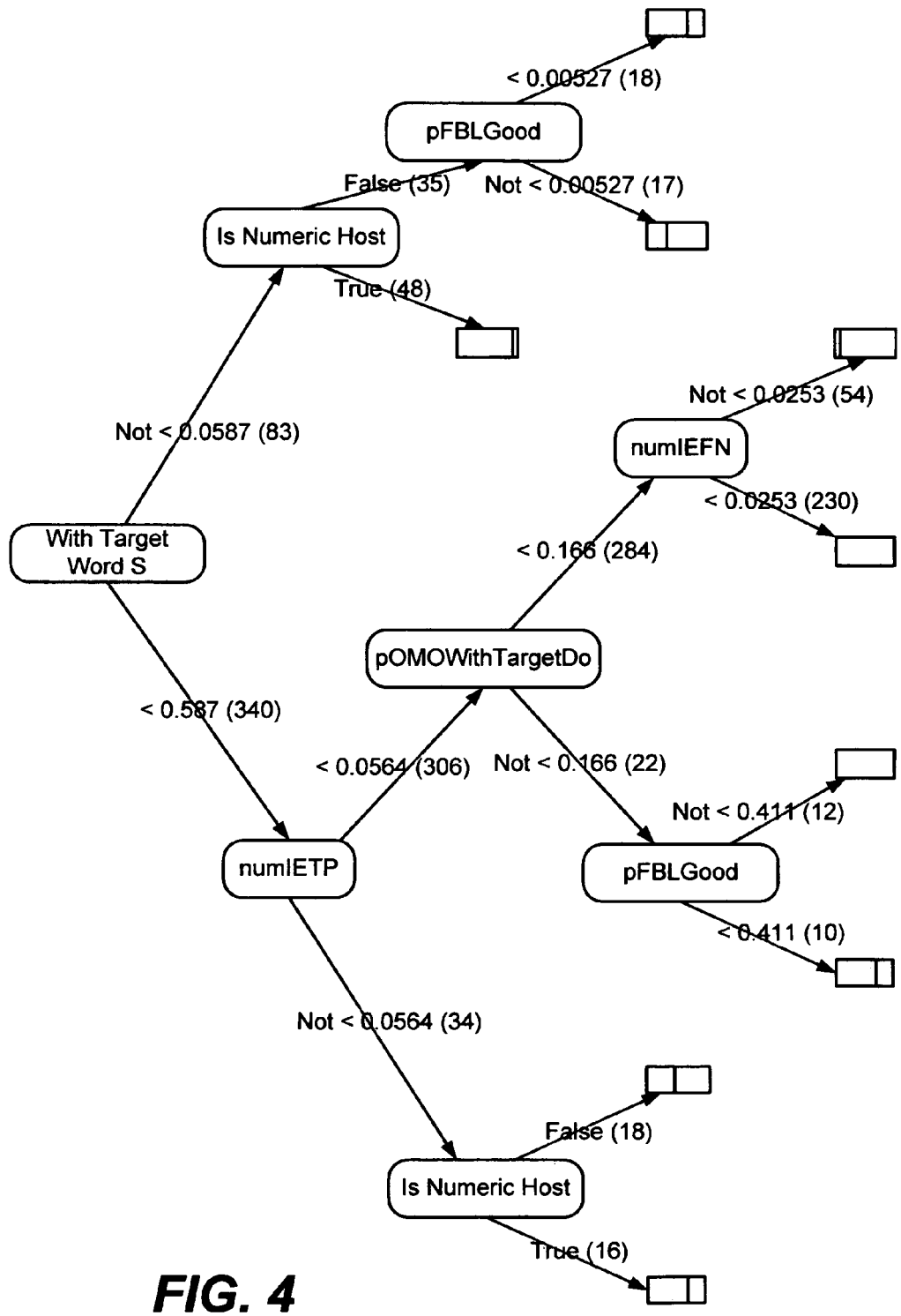
FIG. 4 is an example flow diagram representing various criteria used to classify phishing-related data.

In one example implementation, to generate training data, various training examples (where the isphish field is filled in) were used, along with a large number of testing examples. A decision tree was built on the classified training examples (with kappa=0.8, other parameters at default). FIG. 4 shows one example resulting tree (the portion of the leaf that is shaded, if any, represents the probability that a given site that reaches that leaf is a phishing site). This model encodes the fact (among many others) that if a host appears in emails that have a target word in the subject and is a numeric host, then the probability it is phishing is extremely high.

The topmost node represented in FIG. 4 evaluates the number of target words in the subject line and/or message body (and/or site content) that if present, may indicate a phishing site. The branch direction depends on a numerical value corresponding to this evaluation. In this example decision tree, the "numIETP" decision node represents evaluating the number of browser users (or number per time period such as the last X hours) that reported the site as a true positive suspicious/phishing site; "numIEFN" is a similar number but related to false negatives.

The "pOMOWithTargetDo" decision node represents link structure analysis; the "Is Numeric Host" nodes evaluate the submitted site's host information, and the "pFBLGood" nodes test feedback loop data, which although useful in this example, may not be fast enough to use for many short-lived phishing sites. In any event, in this example a leaf is ultimately reached, providing the classification information (a probability value in this example) for the site/message being evaluated.

Applying this model to the testing data, along with hand examination of some of the messages from the FBL that linked to hosts that had a high probability of being phishing sites according to the model, proved that a large majority of the test sites that fell into the two most-probable phishing leaves were indeed phishing. As can be readily appreciated, investigating any new hosts that fall into these leaves is a reliable way to find new phishing sites. Depending on the classification, reaching a leaf for a site may correspond to taking action to block a site, unblock a site, suggest hand grading, warn users about the possibility of phishing, and any other action.

The following table shows some example statistics on the phish hit rate of the five "most phishy" leaves in the tree:

| P(is Phish) From Model | Number of Phish Found | Number of Non-Phish Examined | Leaf Hit Rate |
|---|---|---|---|
| 0.94 | 27 | 2 | 93.0% |
| 0.72 | 3 | 0 | 100.0% |
| 0.66 | 6 | 32 | 15.8% |
| 0.65 | 2 | 26 | 7.1% |
| 0.45 | 1 | 2 | 33.0% |
| 0.21 | 4 | 23 | 14.8% |

Note that the potential impact of a phishing attack also may be considered, e.g., in a separate or integrated predictive model. For example, if many users in terms of numbers are likely to be attacked, the action taken may be to block immediately, but only temporarily until the site can be hand graded for a permanent decision, regardless of the probability. The amount of potential damage may also be a factor, e.g., a particularly clever attempt to obtain credit card numbers may be treated as severe and blocked even if not that many users are being attacked. Post attack impact data may also be used for future training.

Figure 5:
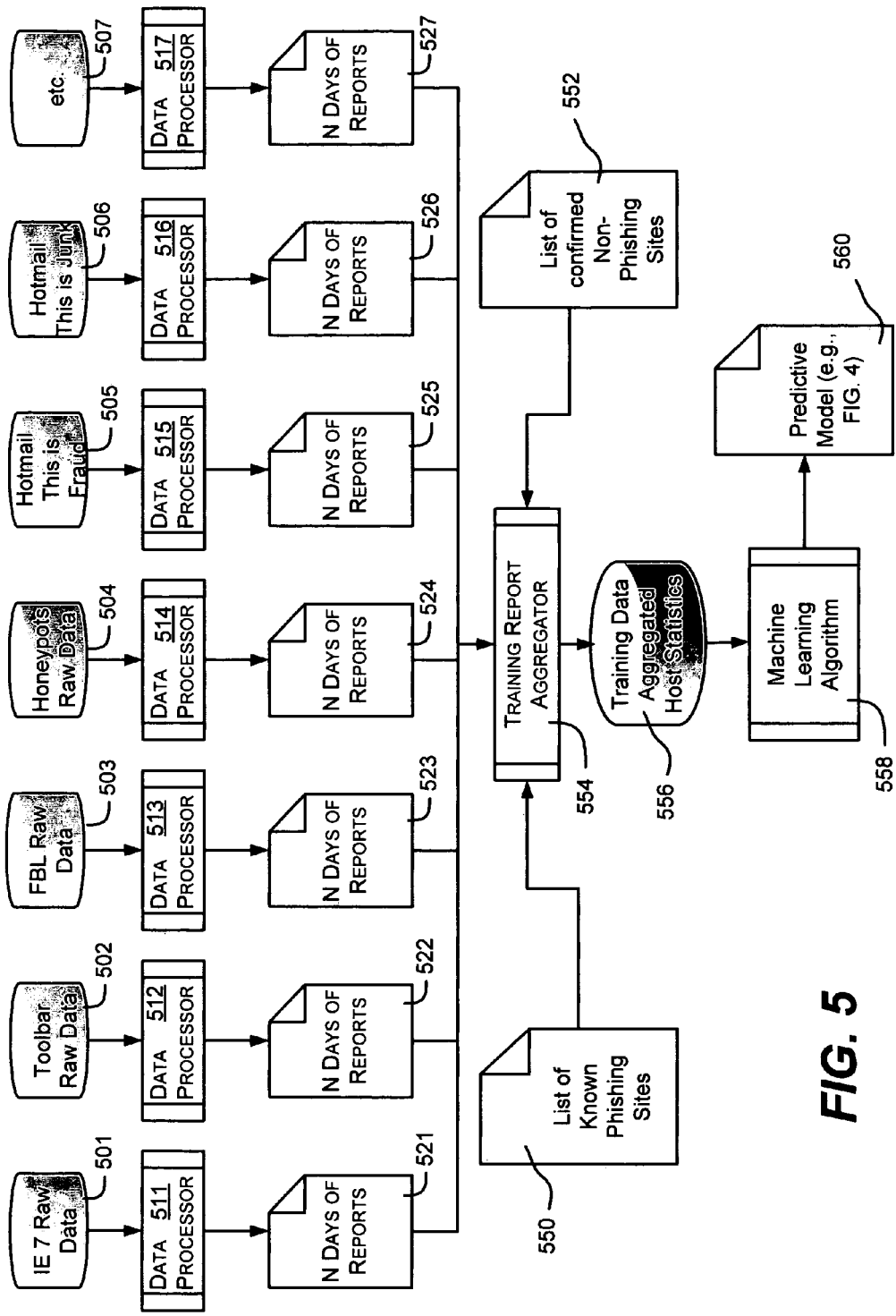
FIG. 5 is a block diagram representing an example architecture for training an evaluation mechanism to differentiate among likely phishing sites and likely non-phishing sites using known phishing-related data.

FIG. 5 is a high-level representation of the training side of a PhishFinder system. Data sources 501-507, data processors 511-517 and report stores 521-527 may be similar components to counterpart components represented in the system of FIG. 3, e.g., the components may be shared between the training and performance sides of the same system. However, the report stores 521-527 for the training system may contain data on longer time periods than does the performance system, e.g., roughly N days of data before the first phishing site that will be trained on first appeared. Note that although the same variable N is used in FIG. 5, N need not be the same value in every report, there may be multiple N values per report (aggregating the same information over multiple time spans), and again, N may be a fraction and/or less than one.

In general, a training report aggregator 554 aggregates information from the report stores 501-507 into a description of how each phishing host (or URL) and confirmed non-phishing host (or URL) was observed in the data streams over the selected time windows. The training report aggregator 554 may generate several aggregated reports per known phishing site, for example using one or more of the following methods:

Using information available immediately upon the first observation of the site in any of the data sources, or one for the first observation in each data source where the site was observed.

One for every J observations of the site in any data source (with a maximum of K). Or N reports divided so each captures an even number of the observations of the site in the data sources.

One per T hours of the lifetime of the site in any of the data sources (with a maximum of M). Or X reports divided evenly among the complete lifespan of the site in the data sources.

Generate one report per known phishing/non-phishing site per T hours of report data.

Using some example values, an exemplary model generates a report using the information available at first observation, and then another one per every T hours (where T=1) hours for the lifetime of that phishing attack, up to a maximum of M (where M=150).

These examples of how phishing sites 550 and non-phishing sites 552 (each of which are updated as graders grade new sites) appear in the data sources are fed as training data/aggregated host statistics 556 to a machine learning algorithm 558. In turn the machine learning algorithm 558 produces a predictive model 560, which, for example, may be used as the predictive model 336 of FIG. 3. The training data/aggregated host statistics 556 contain data for known phishing sites at several time periods. Any algorithm that builds a classification model/probabilistic model is appropriate for generating the predictive model 560 (or the predictive model 336 of FIG. 3), e.g., one implementation used a learning algorithm such as decision tree induction (FIG. 4), while others may employ logistic regression, support vector machines, some hybrid combination of these, and so forth. The predictive model may be changed as needed, e.g., hourly, daily, whenever a new site appears, and so forth, including combinations of these, as new information becomes available. Note that client filtering code also may be updated based on what is learned as new information becomes available, e.g., client training may also be performed. Further, while a single model that integrates information from all of the data sources may be used, it is also feasible to use a separate model that predicts per data source whether a host/URL is phishing or not (e.g. P(host seen in FBL is phishing| how it appeared in FBL)), with a meta learner used to combine the probabilities of the individual models. Standard ensemble learning methods may be used to build a model (e.g. boosting).

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for determining whether a site accessible by a network is likely a phishing site, the method comprising:

recording a plurality of properties and features corresponding to a site, the properties and features being received from a plurality of data sources, each data source of the plurality of data sources comprising:
raw data submissions from one or more users corresponding to phishing sites, and
raw data from closely monitored data sources, each closely monitored data source of the closely monitored data sources comprising:
a seeded dummy email address, suspicious word lists, Internet traffic lists, and domain lists,
tracking each of the plurality of properties at each of a plurality of distinct time resolutions, wherein tracking each property of the plurality of properties comprises:
tracking a URL associated with the site,
tracking a domain associated with the site,
tracking an IP address associated with the site;
wherein each of the plurality of distinct time resolutions comprises a span of time during which the raw data associated with each of the plurality of properties is tracked and collected;
processing information from at least one data source of the plurality of data sources related to a known phishing site;
based upon the recorded plurality of properties and features and based upon the information from at least one data source related to a known phishing site, building a plurality of predictive models using machine learning based on a plurality of different sets of training data; and
constructing a decision tree based upon a plurality of classified training examples, the decision tree having leaf nodes which correspond to the probability of a site being a phishing site based upon the node path used in reaching the leaf node; and
using the predictive models to determine a probability value that the site is a phishing site.

2. The method of claim 1 wherein processing the information comprises generating reports for the plurality of data sources.

3. The method of claim 2 wherein using the predictive model comprises aggregating the reports and applying the predictive model to the aggregated reports.

4. The method of claim 1 further comprising, building a plurality of predictive models using machine learning based on a plurality of different sets of training data.

5. The method of claim 1 wherein building the predictive model includes using a set of known phishing sites and a set of confirmed non-phishing sites.

6. The method of claim 1 wherein using the predictive model comprises classifying the site into at least one class of a plurality of classes, including a class for blocking access to the site and a class for submitting data related to the site to a hand grader.

7. At least one computer-readable storage device having encoded thereon computer-executable instructions, which when executed perform the method of claim 1.

8. The computer-readable storage device of claim 7 wherein using the predictive models to determine a probability value that the site is a phishing site comprises at least one or more of:
using the probability value to automatically warn users from visiting the site with a probability of being a phishing site,
using the probability value to automatically block users from visiting the site with another probability of being a phishing site, and
using the probability value to assist a hand grader in grading the site more efficiently.

9. The computer-readable storage device of claim 7 wherein using the predictive models to determine a probability value that the site is a phishing site comprises applying the predictive model to the aggregated information based on the features of the site.

10. The method of claim 1 further comprising: determining a rate of false positives; determining a rate of false negatives; and determining a comparative cost of a false negative compared to a false positive.

* * * * *